United States Patent [19]
Nozawa et al.

[11] Patent Number: 5,736,934
[45] Date of Patent: Apr. 7, 1998

[54] RADIO PAGING SYSTEM

[75] Inventors: Toshihiro Nozawa, Iida; Shogo Ito, Yokohama; Yoshiaki Hirai, Urawa, all of Japan

[73] Assignee: NTT Mobile Communications Network, Inc., Tokyo, Japan

[21] Appl. No.: 742,703

[22] Filed: Nov. 5, 1996

Related U.S. Application Data

[63] Continuation of Ser. No. 313,022, Dec. 9, 1994, abandoned.

[30] Foreign Application Priority Data

Jan. 28, 1993 [JP] Japan ................. 5-012822

[51] Int. Cl.$^6$ ................. H04Q 1/00
[52] U.S. Cl. ................. 340/825.44; 340/825.47
[58] Field of Search ................. 340/825.44, 825.47

[56] References Cited

U.S. PATENT DOCUMENTS

| | | |
|---|---|---|
| 4,532,332 | 7/1985 | Mori . |
| 4,668,949 | 5/1987 | Akahorie et al. ............... 340/825.44 |
| 4,713,808 | 12/1987 | Gaskill et al. ............... 340/825.44 |
| 4,914,649 | 4/1990 | Schwendeman et al. . |
| 5,109,530 | 4/1992 | Stengel . |
| 5,142,279 | 8/1992 | Jasinski et al. . |
| 5,175,874 | 12/1992 | Auchter ............... 340/825.44 |
| 5,230,084 | 7/1993 | Nguyen . |
| 5,265,270 | 11/1993 | Stengel et al. . |
| 5,274,369 | 12/1993 | Tsunoda et al. . |
| 5,384,564 | 1/1995 | Wycoff et al. . |

FOREIGN PATENT DOCUMENTS

| | | |
|---|---|---|
| 639898A1 | 2/1995 | European Pat. Off. . |
| 57-41044 | 3/1982 | Japan . |
| 2-44821 | 2/1990 | Japan . |

OTHER PUBLICATIONS

"Mobile Radio Communications is the ISDN Age", vol. 1, pp. 24–29, published by OHM–Sha, Ltd., 25 Jul. 1992.

Primary Examiner—Brian Zimmerman
Attorney, Agent, or Firm—Cushman, Darby & Cushman IP Group of Pillsbury Madison & Sutro LLP

[57] ABSTRACT

In a mobile radio communication system wherein mobile units are paged by repeatedly transmitting the same paging signal in n paging signal frames, the number of times a paging signal has been transmitted can be known at the receiving side without the need to transmit additional information, and a time diversity reception scheme can be employed at the receiving side, by forming the paging signal frames from n fixed-length subframes each of which contains a paging signal, and by positioning subframes that contain a new paging signal at one end of the paging signal frames, and, in the case of subframes containing paging signals that will be transmitted for the second or subsequent time, by arranging such subframes with a stagger in accordance with this number of times.

10 Claims, 8 Drawing Sheets

RADIO PAGING SYSTEM

This is a continuation of application Ser. No. 08/313,022, filed Sep. 23, 1994.

TECHNICAL FIELD

This invention is utilized in mobile radio communications, and relates in particular to technology for selectively calling a mobile unit. More precisely, it relates to technology whereby a mobile unit is called by multiple transmissions of a paging signal.

Technology for selectively calling a mobile unit required for mobile communications. However, for simplicity, the example explained below is a radio paging system which employs receive-only mobile units.

BACKGROUND TECHNOLOGY

FIG. 1 shows a conventional frame format for the paging signal frames in a radio paging system (see, for example, "Mobile Radio Communications in the ISDN Age", Vol. 1, p.26, published by OHM-Sha, Ltd., 25th Jul. 1992). In this figure, (a) shows the sending period of the paging signal frame stream, (b) shows the frame format of a paging signal frame, and (c) shows the frame format of a paging signal. As shown in waveform (a) of FIG. 1, the paging signal frame stream sent from a base station comprises signals with period T, where each such signal comprises j paging signal frames with signal length p joined together. As shown in waveformed (b) FIG. 1, a paging signal frame comprises a synchronization signal and a plurality of paging signals which belong to this paging signal frame and which have different lengths. As shown in FIG. 1, a paging signal comprises error correcting codes obtained by the addition of check bits to both address information and message information.

FIG. 2 shows a conventional frame format for a paging signal frame. In this figure, (a) shows the frame format of the paging signal frame at time t0, while (b) shows the frame format of the paging signal frame at time (t0+T). Radio paging systems employ multiple sending to achieve high quality paging signal transmission. This is a method wherein the same paging signal is sent many times (n times) at the transmitting side, and call processing (usually involving an alert and a message display) is carried out at the receiving side on the basis of one of these n paging signals having been correctly decoded. When such a method is employed, in order for the receiving side to receive the same paging signal a plural number of times, it has to recognize the number of times the paging signal has been sent. For this purpose, counter bits indicating the number of times the paging signal has been sent (or the remaining number of times that it will be sent) have hitherto been provided in each paging signal that is sent. The receiving side has therefore recognized the number of times that a paging signal has been sent by counting up (or counting down) the counter bits each time the paging signal is sent.

This will be explained with reference to the example depicted in FIG. 2. As shown in waveform (a) of FIG. 2, the paging signal frame at time t0 comprises four paging signals A–D with different lengths. Paging signal A is being sent for the $n^{th}$ time, paging signal B is being sent for the $m^{th}$ time (m<n), paging signal C is being sent for the $h^{th}$ time (h<m<n), and paging signal D is being sent for the first time. As shown in waveform (b) of FIG. 2, paging signal A is not sent in the paging signal frame at time t0+T. This is because n transmissions have been completed for paging signal A at time t0. Instead, paging signals B–D are moved to the left and their counter values are increased by 1 over the values they had at time t0. In addition, new paging signal E with a counter value of "1" is sent following paging signals B–D.

By sending the same paging signal numerous times, call processing at the receiving side may be carried out on the basis of one of these n paging signals having been correctly decoded, which effectively increases the reliability of paging. However, conventional systems have had the following defect: namely, because the number of times a paging signal has been sent is inserted in the paging signal, there has been a resulting decrease in throughput.

Moreover, in conventional systems, although the same paging signal is being received at the receiving side, its position changes irregularly due to its transmission position being shifted to the left every time a paging signal frame is transmitted, and it is necessary to receive a multiplicity of paging signals with different counter values. It has therefore been impossible to utilize a time diversity reception scheme. Time diversity is a known technique for obtaining high quality signal transmission, and is a scheme wherein bit decision in respect of the same signal received a multiplicity of times in a fixed period is performed using reliability information for each bit (the envelope level and the detector output).

This invention solves the foregoing problems, and its purpose is to provide a mobile radio communication system wherein the number of times that a paging signal has been transmitted can be discovered at the receiving side without having to provide information within the paging signal relating to the number of times it has been transmitted. A further purpose of this invention is to provide a mobile radio communication system wherein time diversity reception of these paging signals at the receiving side is possible.

DISCLOSURE OF THE INVENTION

With respect to mobile radio communication systems which have a base station which transmits paging signal frames to pagers via radio channels, the paging signal frames comprise a plurality of paging signals to which addresses to be paged have been attached. This base station includes a means which repeatedly transmits the same paging signal in n paging signal frames (where n is a natural number). The paging signal frames comprise n fixed-length subframes each of which contains a paging signal, and the repeated transmission means includes a means which inserts a new paging signal into the subframe positioned at one end of the paging signal frame, and inserts a paging signal that will be transmitted for the second or subsequent time into a subframe positioned at a location corresponding to this number of times.

The insertion means should include a means which inserts a new paging signal into the first subframe of the paging signal frame that is sent the $i^{th}$ time ($2 \leq i \leq n$), and which inserts the paging signal of the subframe positioned $m-1^{th}$ in the paging signal frame that is sent the $i-1^{th}$ time, into the $m^{th}$ subframe ($2 \leq m \leq n$) of the paging signal frame that is sent the $i^{th}$ time.

This invention also provides a pager for use in this sort of mobile radio communication system. That is to say, it is characterised in that in a pager which has a receiving means which receives paging signal frames that have been transmitted from a base station via a radio channel, the paging signal frames comprise a plurality of paging signals to which addresses to be paged have been attached. The receiving means includes a means which repeatedly receives the same paging signal in n paging signal frames (where n is a natural number). The paging signal frames comprise n fixed-length subframes each of which contains a paging signal, and are such that a new paging signal is inserted into the subframe positioned at one end of the paging signal frame, and a paging signal that will be transmitted for the second or subsequent time is inserted into a subframe positioned at a location corresponding to this number of times, and the repeated receiving means includes a means which receives the same paging signal at subframe positions corresponding to the number of times it has been transmitted.

It is desirable for the repeated receiving means to include a means which uses reliability information to perform bit decision on signals received from the plurality of subframes corresponding to the same paging signal. The means which performs bit decision may be constituted so as to operate always, or so as to operate on the basis of some mode changeover.

This invention enables throughput to be increased, since information showing the number of times a signal has been sent is not required. Furthermore, because the position in which the paging signal is sent changes regularly with each transmission period and the signal position can be predicted in advance at the receiver, a time diversity reception scheme becomes possible.

An embodiment of this invention will now be explained with reference to the drawings.

OPTIMUM CONFIGURATION FOR EMBODYING THE INVENTION

Figure 1:
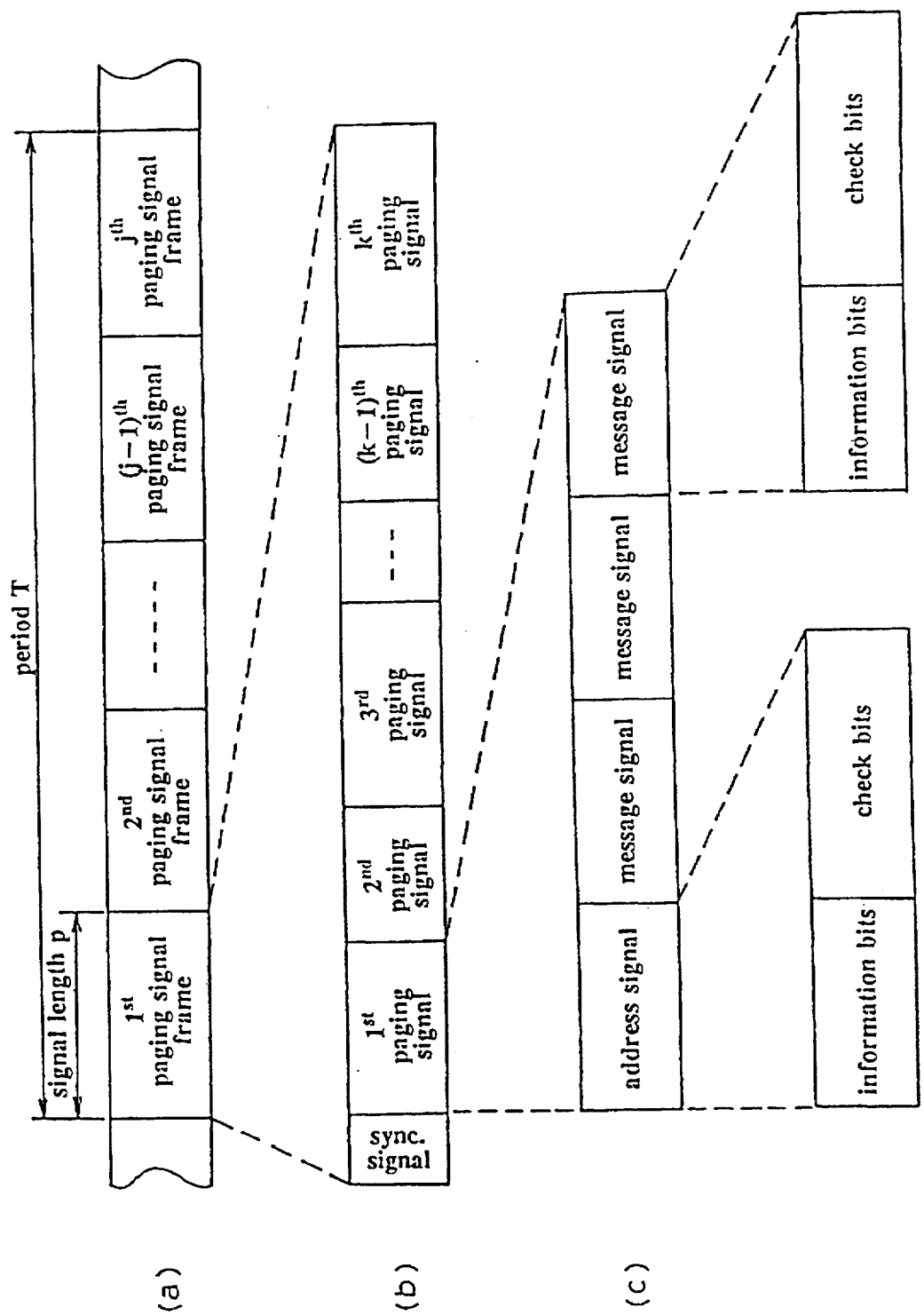
FIG. 1 shows a conventional frame format for paging signal frames in a radio paging system.
Figure 2:
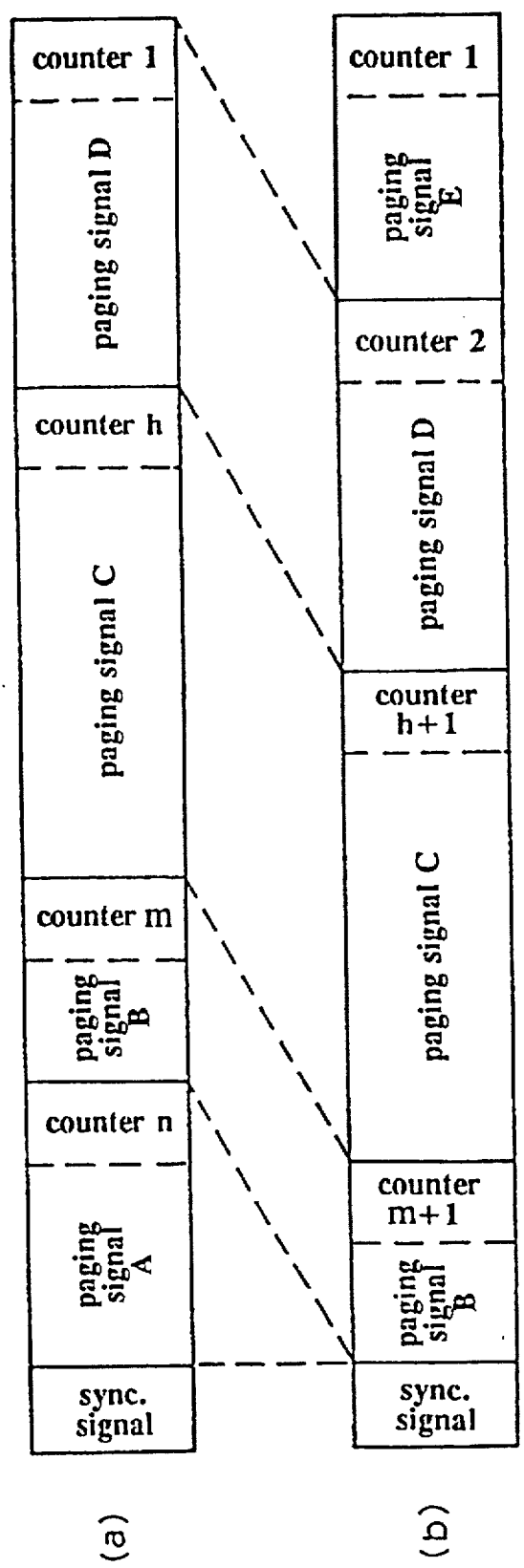
FIG. 2 shows a conventional frame format for paging signal frames for each period.
Figure 3:
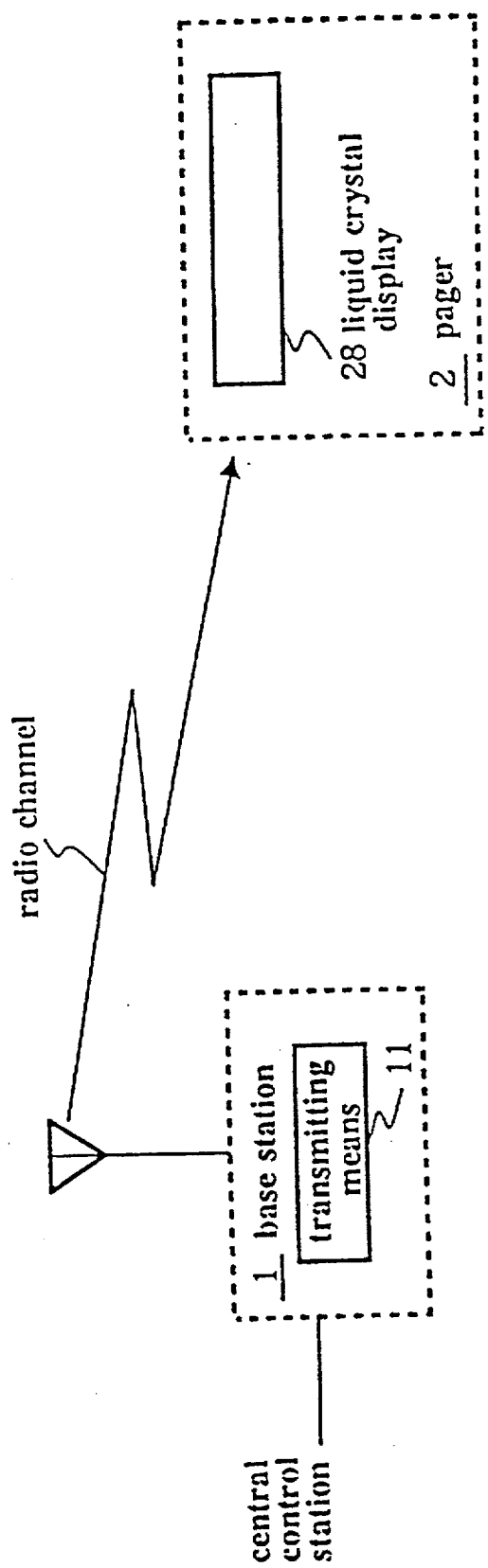
FIG. 3 is a block diagram showing a radio paging system according to an embodiment of this invention.
Figure 4:
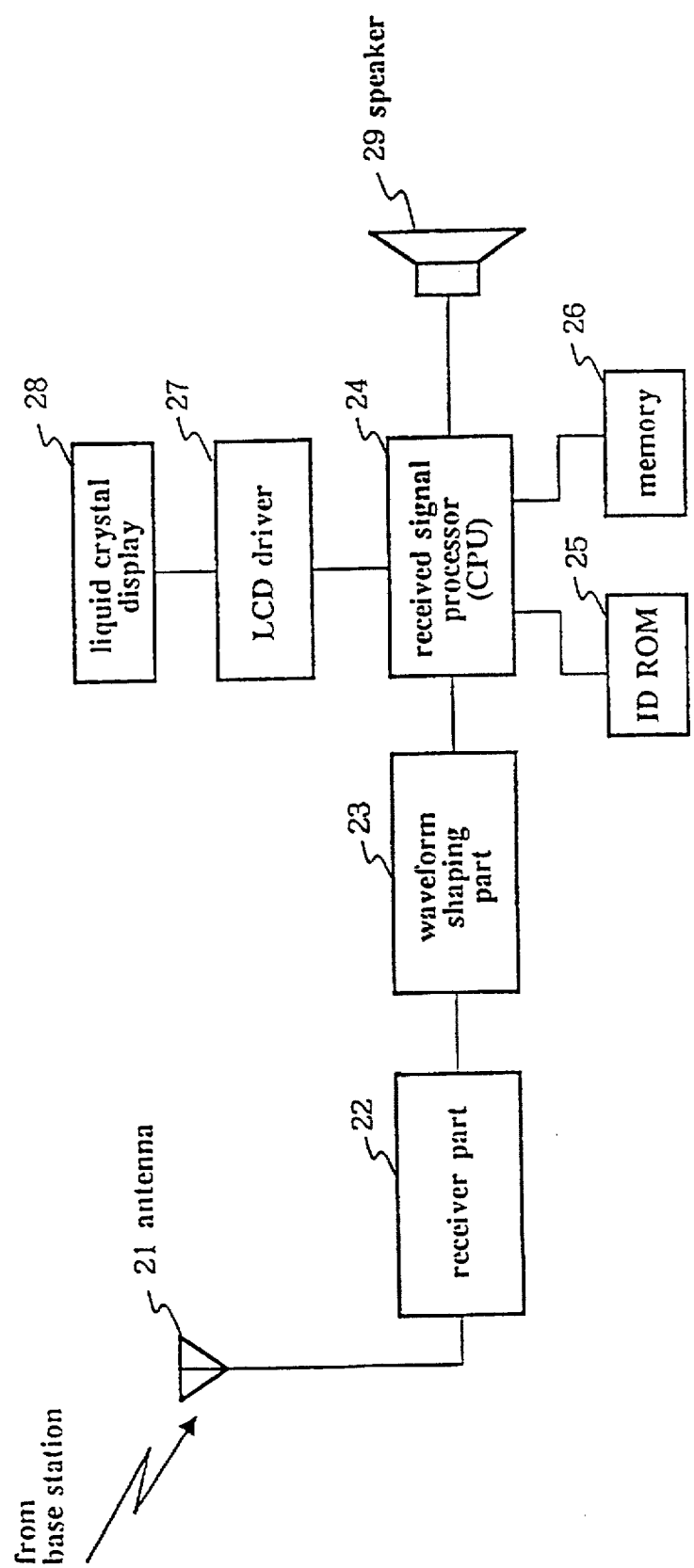
FIG. 4 is a block diagram showing a pager according to an embodiment of this invention.

FIG. 3 is a block diagram of a radio paging system according to an embodiment of this invention, and FIG. 4 is a block diagram of a pager of a radio paging system according to this invention.

This embodiment has base station 1 which transmits paging signal frames to pager 2 via a radio channel, the paging signal frames comprising a plurality of paging signals to which addresses to be paged have been attached, and in this base station 1 there is provided transmitter part 11 as a means which repeatedly transmits the same paging signal in n paging signal frames (where n is a natural number). The paging signals comprise, in addition to an address, message signals for the called party and check bits for the address and the message signals. Pager 2 has antenna 21, receiver part 22, waveform shaping part 23, received signal processor 24, ID ROM 25, memory 26, LCD driver 27, liquid crystal display 28 and speaker 29. The paging signal frame comprises n fixed-length subframes each of which contains a paging signal. Transmitter part 11 inserts a new paging signal into the subframe positioned at one end of the paging signal frame, while a paging signal that will be transmitted for the second or subsequent time is inserted into a subframe positioned at a location corresponding to this number of times.

The operation of a radio paging system with this constitution will now be explained.

Figure 5:
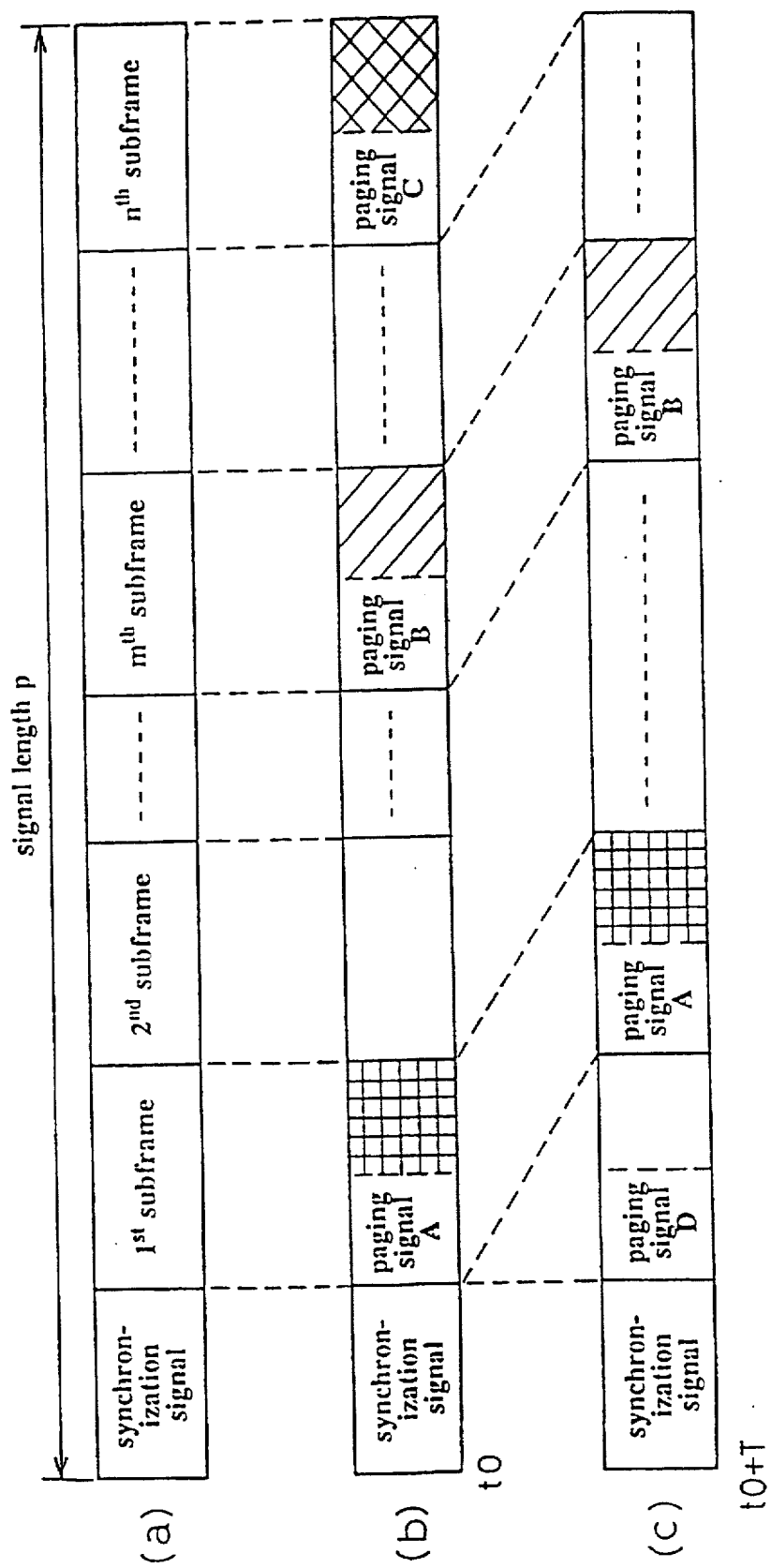
FIG. 5 shows the frame format of a paging signal frame, and shows the arrangement of paging signals for each period.

FIG. 5 serves to explain the frame format of the paging signal frame, and shows the arrangement of paging signals for each period T.

As shown in waveform (a) of FIG. 5, a single paging signal frame is divided into n fixed-length subframes, where n is the maximum number of times a paging signal is sent. FIG. 5 shows the paging signal frame at time t0 in waveform (b). Paging signals A, B and C are sent in the $1^{st}$, $m^{th}$ and $n^{th}$ subframes respectively, in accordance with the number of times they have each been transmitted, namely: 1, m and n. FIG. 5 shows the paging signal frame at time t0+T in waveform (c). Paging signal A is sent in the second subframe because it is now being transmitted for the second time. Paging signal B is sent in the $m+1^{th}$ subframe, because it is now being transmitted for the $m+1^{th}$ time. Paging signal C is not sent at time t0+T, since transmission for the $n^{th}$ time was completed at time t0. In addition, because paging signal D will be transmitted for the first time at time t0+T, it is sent in the first subframe.

Thus, because the sending position of a signal changes systematically each time the signal is sent, the position of the signal can be predicted beforehand at the receiver side, and so a paging signal comprising the same bits, and not having counter bits to enable the number of times the signal has been transmitted to be recognized, will be sent n times.

Figure 6:
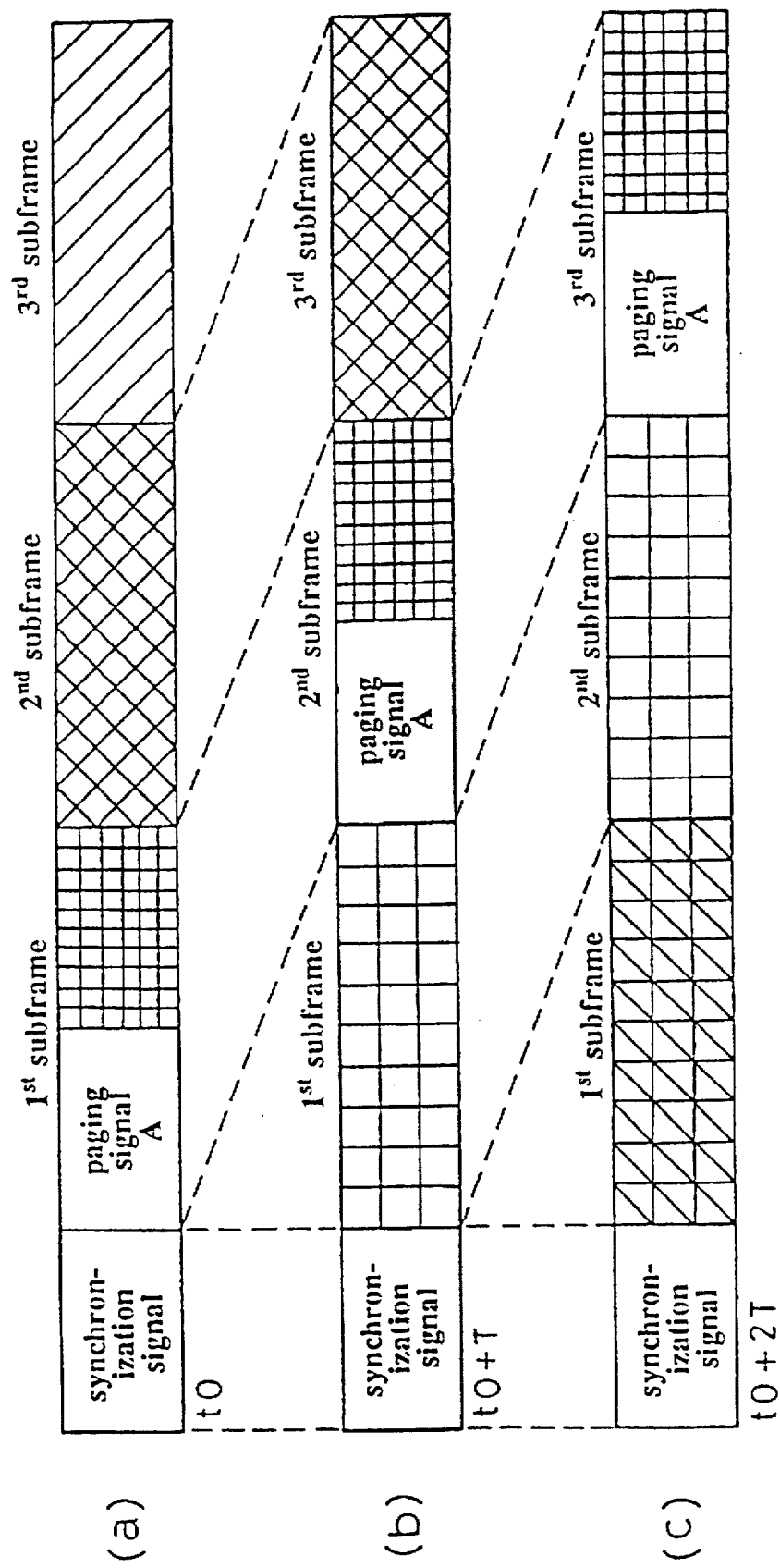
FIG. 6 shows the frame format of a paging signal frame, and shows the position of subframes for each period when there are three transmissions.
Figure 7:
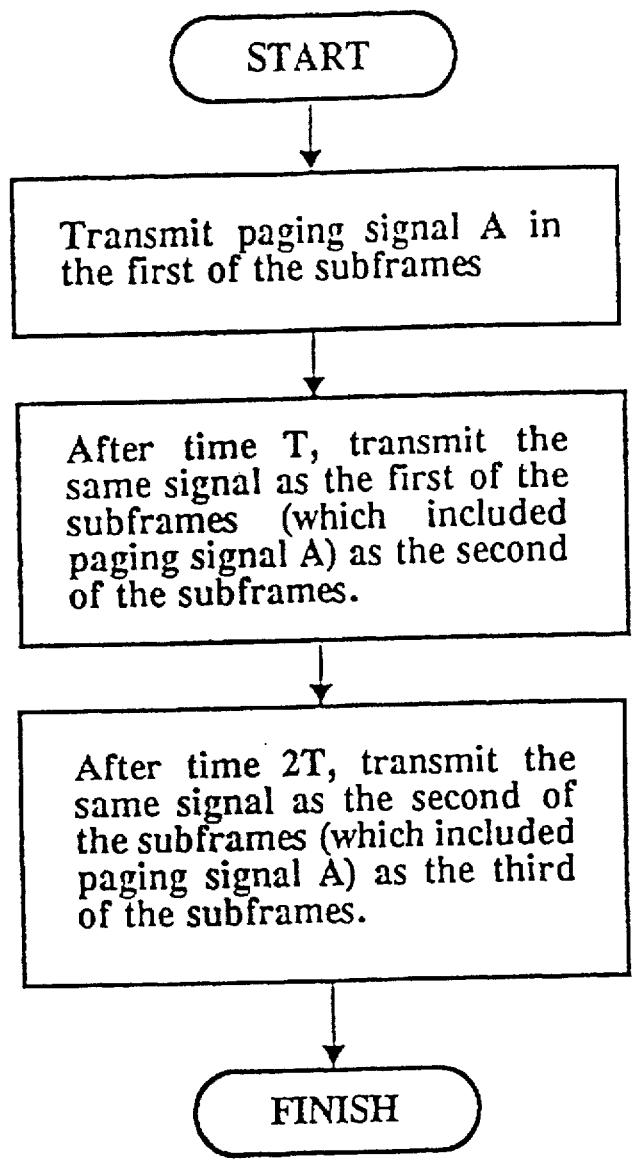
FIG. 7 is a flowchart showing the operation of the base station when there are three transmissions.
Figure 8:
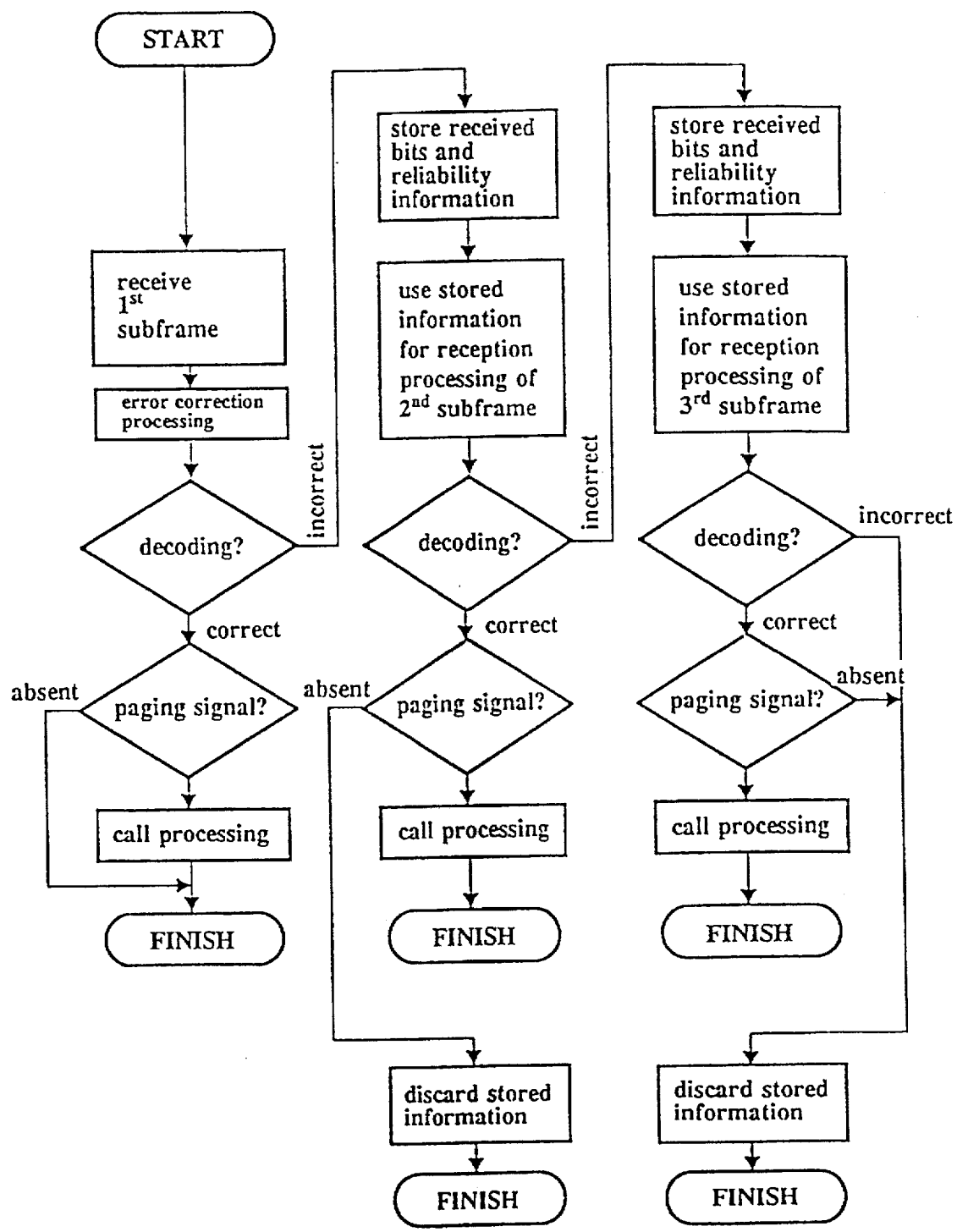
FIG. 8 is a flowchart showing the operation of a pager when there are three transmissions.

FIG. 6 serves to explain the frame format of the paging signal frame, and shows the position of subframes for each period T. FIG. 7 is a flowchart showing the operation of base station 1. FIG. 8 is a flowchart showing the operation of pager 2 for a given paging signal. The explanation given below will be for the case where the paging signal is repeated three times. The section of the paging signal frame that follows the synchronization signal is therefore transmitted after being divided into three fixed-length subframes. The following explanation will deal with paging signal A and with the operation of pager 2 at the destination of this signal.

First of all, referring to FIG. 6 and FIG. 7, an explanation will be given of the operation of transmitting station 1. FIG. 6 shows the paging signal frame at time t0 in waveform (a). Because paging signal A is being sent for the first time, it is inserted into the first subframe. FIG. 6 shows the paging signal frame at time t0+T in waveform (b). At this point in time, the same signal as the one that was sent in the first subframe at time t0 (i.e., paging signal A) is sent in the second subframe. FIG. 6 shows the paging signal frame at time t0+2T in waveform (c). At this point in time, the same signal as the one that was sent in the second of the subframes at time t0+T (i.e., paging signal A) is sent in the third subframe.

By sending paging signals in this manner, the receiving side can know beforehand the position at time t0+T and at time t0+2T of the paging signal that was sent at time t0. Moreover, because this paging signal is constituted from the same bits, a time diversity reception scheme is possible.

Next, referring to FIG. 6 and FIG. 8, an explanation will be given of the operation of the pager, and in particular of the operation of received signal processor 24.

In the paging signal frame received at time t0+τ, where τ is the transmission delay time, the first subframe, in which a new paging signal has been inserted, will be received, whereupon error correction processing is carried out. If decoding is carried out correctly and there is a paging signal addressed to the pager in question, call processing is carried out. If decoding cannot be carried out correctly, the received bits and reliability information are stored.

In the next paging signal frame, i.e., in the paging signal frame received at time t0+T+τ, the second subframe will be received. If decoding is carried out correctly and there is a paging signal addressed to the pager in question, call processing is carried out. If decoding cannot be carried out correctly, the received bits and reliability information are stored. Hence, the paging signal that was contained in the paging signal frame received at time t0+τ is also inserted, at a prearranged position, in the paging signal frame received at time t0+T+τ. Moreover, these paging signals are comprised of the same bits. This can be utilized to implement a time diversity reception scheme at the receiving side. That is to say, because the bits and reliability information stored for the first subframe at time t0+τ, and the bits and reliability information stored for the second subframe at the next time t0+T+τ, are bits and reliability information relating to entirely the same signal, this signal will be decoded on the basis of time diversity reception processing. If decoding is carried out correctly and a paging signal addressed to the pager in question is present, call processing will be carried out. If decoding is not carried out correctly, the bits and reliability information are stored.

In the next paging signal frame, i.e., in the paging signal frame received at time t0+2T+τ, the third subframe will be received. If decoding is carried out correctly and there is a paging signal addressed to the pager in question, call processing is carried out. If decoding is not carried out correctly, this receiving operation is terminated. If a time diversity reception scheme is in operation, then, because the bits and reliability information stored after the first subframe was received at time t0+τ, and the bits and reliability information stored after the second subframe was received at time t0+T+τ, and the bits and reliability information stored after the third subframe was received at time t0+2T+τ, all relate to the same signal, these can be used to carry out reception processing. As a result, if decoding is carried out correctly and there is a paging signal addressed to the pager in question, call processing will be carried out. If decoding is not carried out correctly, the information of the corresponding subframes, which was stored at times t0+τ, t0+T+τ and t0+2T+τ, is discarded.

In the foregoing explanation, the operation of the pager was explained with reference to one and the same paging signal. In practice, however, the processing shown in FIG. 8 will be performed n times in parallel.

As the subject of this embodiment, the pager can be merchandised separately as a commercial product, and users can use it in a paging network.

The explanation given in the foregoing embodiment concerned a case where the paging signal frame comprised a synchronization signal and a plurality of subframes. Nevertheless, it is not essential to provide a synchronization signal in the paging signal frame, and this invention can be implemented in similar manner when, for example, a synchronization signal is provided in every $n^{th}$ paging signal frame, where n is a small number. This invention can likewise be implemented using frames in which the address information and the message information of the paging signals are respectively gathered together in separate fields.

The foregoing explanation concerned, by way of example, a radio paging system which used a receive-only mobile unit. Nevertheless, when a mobile unit capable of two-way communication is to be paged via a control channel, a pager according to this invention can be used as the receiving part of such a mobile unit, and this invention can be implemented in similar manner.

As has now been explained, because information showing the number of times a paging signal has been sent is not required with this invention, throughput can be improved. In addition, a time diversity reception scheme at the receiver side is possible.

We claim:

1. A mobile radio communication system comprising:
   a plurality of pagers; and
   a base station for transmitting a plurality of paging signal frames to said plurality of pagers via at least one radio channel, each of said plurality n of paging signal frames including a plurality n of fixed-length subframes, n being a natural number, a first of said plurality n of fixed-length subframes being closest to a synchronization signal from said base station and an $n^{th}$ of said plurality n of fixed-length subframes being farthest from said synchronization signal, each of said plurality n of fixed-length subframes containing a plurality of paging signals each having an address signal indicating a unique address corresponding to at least one of said plurality of pagers associated therewith, said base station including repeated transmitting means for transmitting a same paging signal in each of said plurality of paging signal frames, said repeated transmitting means comprising:
   new paging signal inserting means for inserting a new paging signal to be transmitted by said base station for a first time into said first one of said plurality n fixed-length subframes, and
   repeated paging signal inserting means for inserting a repeated paging signal to be transmitted by said base station for at least a second time into one of said n fixed-length subframes positioned according to a number of times that said repeated paging signal is to be transmitted by said base station, said repeated paging signal being positioned differently for each transmission thereof.

2. A mobile radio communication system according to claim 1, wherein:
   said repeated paging signal inserting means removes said repeated paging signal from one of said n fixed-length subframes positioned one less than said number of times that said repeated paging signal is to be transmitted currently by said base station.

3. A pager in a mobile radio communication system, said pager comprising:
   a receiver for receiving a plurality of paging signal frames from a base station transmitted via at least one radio channel, each of said plurality n of paging signal frames including a plurality n of fixed-length subframes, n being a natural number, a first of said plurality n of fixed-length subframes being closest to a synchronization signal from said base station and an $n^{th}$ of said plurality n of fixed-length subframes being farthest from said synchronization signal, each of said plurality n of fixed-length subframes containing a plurality of paging signals each having an address signal indicating a unique address corresponding to at least one of said plurality of pagers associated therewith, said at least one of said plurality of pagers including repeated receiving means for receiving a same paging signal in each of said plurality of paging signal frames, said repeated receiving means comprising:

new paging signal receiving means for receiving a new paging signal transmitted by said base station for a first time in said first one of said plurality n fixed-length subframes, and repeated paging signal receiving means for receiving a repeated paging signal transmitted by said base station for at least a second time in one of said n fixed-length subframes positioned according to a number of times that said repeated paging signal has been transmitted by said base station, said repeated paging signal being positioned differently for each transmission thereof.

4. A pager in a mobile radio communication system according to claim 3, wherein said repeated receiving means further comprises:

means for storing said new paging signal;

means for developing reliability information based on said stored new paging signal; and means for using said developed reliability information to perform bit decision on said repeated paging signal.

5. A pager in a mobile radio communication system according to claim 3, wherein said repeated receiving means further comprises:

means for storing said new paging signal and said repeated paging signal;

means for developing reliability information based on said stored new paging signal and said repeated paging signal; and means for using said developed reliability information to perform bit decision on said paging signal each time received by said receiver subsequent to said at least said second time.

6. A method of communicating repeatedly a paging signal from a base station to at least one of a plurality of pagers, said method comprising steps of:

transmitting from said base station a plurality of paging signal frames to said plurality of pagers via at least one radio channel, each of said plurality n of paging signal frames including a plurality n of fixed-length subframes, n being a natural number, a first of said plurality n of fixed-length subframes being closest to a synchronization signal from said base station and an $n^{th}$ of said plurality n of fixed-length subframes being farthest from said synchronization signal, each of said plurality n of fixed-length subframes containing a plurality of paging signals each having an address signal indicating a unique address corresponding to at least one of said plurality of pagers associated therewith;

transmitting repeatedly a same paging signal in each of said plurality of paging signal frames, said step of transmitting repeatedly including steps of:

inserting a new paging signal to be transmitted by said base station for a first time into said first one of said plurality n fixed-length subframes, and inserting a repeated paging signal to be transmitted by said base station for at least a second time into one of said n fixed-length subframes positioned according to a number of times that said repeated paging signal is to be transmitted currently by said base station, said repeated paging signal being positioned differently for each transmission thereof.

7. A method of communicating repeatedly a paging signal from a base station to at least one of a plurality of pagers according to claim 6, said method further comprising a step of:

removing said repeated paging signal from one of said n fixed-length subframes positioned one less than said number of times that said repeated paging signal is to be transmitted currently by said base station.

8. A method of receiving a paging signal transmitted repeatedly from a base station to a plurality of pagers, said method comprising steps of:

receiving a plurality of paging signal frames from said base station transmitted via at least one radio channel, each of said plurality n of paging signal frames including a plurality n of fixed-length subframes, n being a natural number, a first of said plurality n of fixed-length subframes being closest to a synchronization signal from said base station and an $n^{th}$ of said plurality n of fixed-length subframes being farthest from said synchronization signal, each of said plurality n of fixed-length subframes containing a plurality of paging signals each having an address signal indicating a unique address corresponding to at least one of said plurality of pagers associated therewith;

receiving repeatedly a same paging signal in each of said plurality of paging signal frames, said step of receiving repeatedly said same paging signal comprising steps of:

receiving a new paging signal transmitted by said base station for a first time in said first one of said plurality n fixed-length subframes, and receiving a repeated paging signal transmitted by said base station for at least a second time in one of said n fixed-length subframes positioned according to a number of times that said repeated paging signal has been transmitted by said base station, said repeated paging signal being positioned differently for each transmission thereof.

9. A pager in a mobile radio communication system according to claim 8, wherein said step of receiving repeatedly further comprises steps of:

storing said new paging signal;

developing reliability information based on said stored new paging signal; and performing a bit decision on said repeated paging signal using said developed reliability information.

10. A pager in a mobile radio communication system according to claim 8, wherein said step of receiving repeatedly further comprises steps of:

storing said new paging signal and said repeated paging signal;

developing reliability information based on said stored new paging signal and said repeated paging signal; and performing a bit decision on said paging signal each time received subsequent to said at least said second time using said developed reliability information.

* * * * *

UNITED STATES PATENT AND TRADEMARK OFFICE
CERTIFICATE OF CORRECTION

PATENT NO.    : 5,736,934
DATED         : April 7, 1998
INVENTOR(S)   : NOZAWA et al.

It is certified that error appears in the above-identified patent and that said Letters Patent is hereby corrected as shown below:

TITLE PAGE

Please change the Related U.S. Application Data to:

[63] Continuation of Ser. No. 313,022, Sep. 23, 1994, Abandoned, which was the national phase based on international application number PCT/JP94/00107, filed Jan. 27, 1994.

Please change first paragraph of Column 1 to read:

This is a continuation of Application Ser. No. 08/313,022, filed Sep. 23, 1994 Abandoned, which was the national phase based on international application number PCT/JP94/00107, filed Jan. 27, 1994.

Signed and Sealed this

Twenty-eighth Day of September, 1999

*Attest:*

Q. TODD DICKINSON

*Attesting Officer*    *Acting Commissioner of Patents and Trademarks*